J. C. MOORE.
VEHICLE SPRING.
APPLICATION FILED MAR. 27, 1916.
1,202,407.
Patented Oct. 24, 1916.
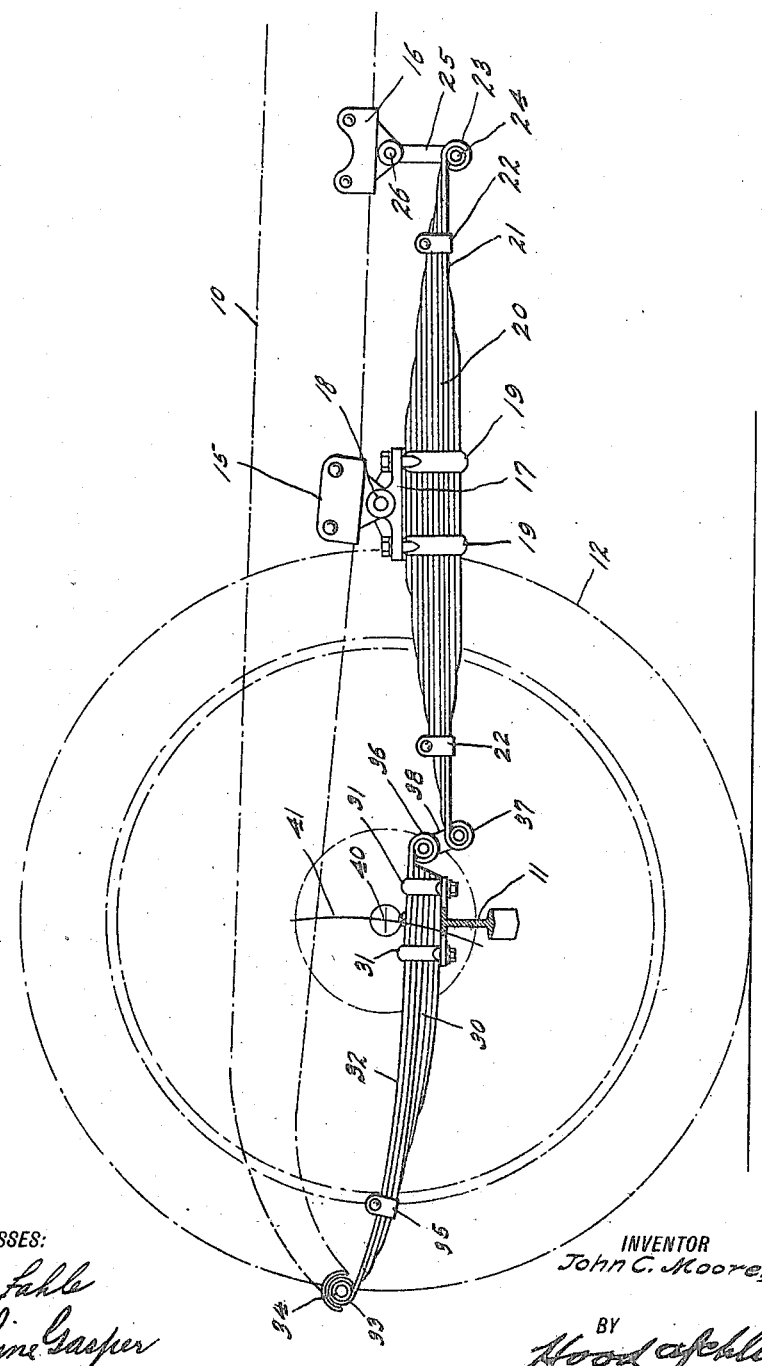

UNITED STATES PATENT OFFICE.

JOHN C. MOORE, OF CONNERSVILLE, INDIANA.

VEHICLE-SPRING.

1,202,407.　　　　Specification of Letters Patent.　　　Patented Oct. 24, 1916.

Application filed March 27, 1916. Serial No. 86,856.

*To all whom it may concern:*

Be it known that I, JOHN C. MOORE, a citizen of the United States, residing at Connersville, in the county of Fayette and State of Indiana, have invented a new and useful Vehicle-Spring, of which the following is a specification.

It is the object of my invention to provide an efficient cantaliver spring construction for automobiles, and one which relieves the cantaliver spring of forward and rearward thrusts, which permits the wheel to yield rearwardly slightly when it rises over an obstruction, and which is especially applicable to the front wheels of automobiles.

The accompanying drawing illustrates my invention. Its single figure is a side elevation of a cantaliver spring constructed in accordance with my invention, showing the front automobile axle in section and indicating one of the front wheels and a portion of the chassis in chain lines.

The frame or chassis 10, the front axle 11, and the front wheel 12 are of any suitable type. Fixed to the under side of each longitudinal member of the chassis 10 are two fittings 15 and 16. A spring-attaching plate 17 is mounted by a pivot pin 18 in the fitting 15, and has attached to its under face by clamps 19 the middle part of a cantaliver spring 20. This cantaliver spring has one leaf 21 which is longer than the other leaves, this long leaf 21 having both above and below it a series of successively shorter leaves, the number of leaves above it preferably being greater than the number of leaves below it, as clear from the drawing. Near each end the long leaf 20 is clamped to the two or three leaves immediately above it by a clamp 22, so that in case of downward bending of the ends of the spring relative to its middle portion the ends of these leaves just above the long leaf 21 are bent downward with the ends of such long leaf. The rear end of the long leaf 21 is bent to form an eye 23 which surrounds a pin 24 at the lower end of a link or links 25 carried by a pivot pin 26 in the fitting 16.

The forward end of the cantaliver spring 20 is not connected directly to the front axle 11. Instead, it is hung by a link from such front axle, and the front axle is connected by a connecting member to a point on the chassis 10 ahead of and above such front axle. In the specific form shown, a quarter elliptic spring 30 furnishes this connecting member. This spring 30 is clamped at its rear and heavier end to the axle 11 by clamps 31, and comprises a number of spring leaves of different lengths, the top leaf 32 being the longest. This top leaf 32 extends forward beyond the other leaves and is bent into an eye 33 which is connected by a pivot pin 34 to the down-turned front end of the longitudinal member of the chassis 10, and is clamped near its forward end to one or two of the leaves immediately below it by a clamp 35, so that in case the forward end of the spring 30 bends upward the forward end of these leaves immediately below it bend with it. The rear end of the top leaf 32 projects rearwardly beyond the other leaves of the spring 30 and beyond the clamp 31 and is bent to form an eye 36, which is connected to an eye 37 formed on the forward end of the long leaf 21 of the spring 20 by a link or links 38 mounted on pivot pins in eyes 36 and 37.

In operation, the weight of the vehicle and chassis pushes downward on both the middle and the rear end of the spring 20, and place the links 25 and 38 both in tension, so that the spring 20 tends to bend upward at the ends. The middle and rear end of the spring 20 being held stationary relatively to the chassis 10, bending of the front end of such spring is double the relative movement of the chassis and front axle, so that a very easy riding is produced. The spring 20 is under no forward and rearward strain, for the traction effect on the wheel 12 is obtained from the chassis 10 through the spring 30, which acts as a tension member to draw forward the axle 11 and the front wheel. When an obstruction is encountered by the wheel 12 and it is forced upward, it yields slightly to the rear, because the axis 40 of the wheel moves in the arc 41 which has as its center the pivot pin 34 which is slightly higher than the axis 40. This reduces strains on the structure, and further promotes ease of riding. By reason of the cantaliver action of the spring 20, the vertical movement of the chassis 10 is always small as compared with that of the wheel 12. If there is any rebound of the chassis 10 from striking an obstruction, it is thus necessarily small; and what there is is taken care of by the downward bending of the long leaf 21 of the spring 20 and the leaves immediately above and below such long leaf.

I have described my invention only as applied to one side of the vehicle, but of course, in ordinary practice, the construction is duplicated on both sides. I have also described the structure particularly as applied to the front wheel and axle, but it is not limited to this application.

I claim as my invention:

1. A cantaliver spring construction for vehicles, comprising a leaf spring connected at its middle and at one end to the vehicle frame, the other end of said spring being near the axle, a link interconnecting the latter end of said spring and said axle, and a connection from said axle to a point on the vehicle frame on the other side of said axle from said spring, said connection being pivoted to the vehicle frame at such a level that when the axle is moved upward with relation to the vehicle frame it also moves somewhat longitudinally of said frame in the direction opposite to the normal vehicle movement.

2. A cantaliver spring construction for vehicles, comprising a leaf spring connected at its middle and at one end to the vehicle frame, the other end of said spring being near the axle, a link interconnecting the latter end of said spring and said axle, and a connection from said axle to a point on the vehicle frame on the other side of said axle from said spring.

3. A cantaliver spring construction for vehicles, comprising a leaf spring connected at its middle and at one end to the vehicle frame, the other end of said spring being near the axle, a link interconnecting the latter end of said spring and said axle, and a connection from said axle to a point on the vehicle frame on the other side of said axle from said spring, said connection being pivoted to the vehicle frame at such a level that when the axle is moved upward with relation to the vehicle frame it also moves somewhat longitudinally of said frame in the direction opposite to the normal vehicle movement, said connection being formed by a second leaf spring.

4. A cantaliver spring construction for vehicles, comprising a leaf spring connected at its middle and at one end to the vehicle frame, the other end of said spring being near the axle, a link interconnecting the latter end of said spring and said axle, and a connection from said axle to a point on the vehicle frame on the other side of said axle from said spring, said connection being formed by a second leaf spring.

5. A cantaliver spring construction for vehicles, comprising a leaf spring connected at its middle and at its rear end to the vehicle frame, the forward end of said spring being near the axle, a link interconnecting the forward end of said spring and said axle, and a connection from said axle to a point on the vehicle frame in advance of the axle, said connection being pivoted to the frame at a point which is higher than the axis of the wheel mounted on said axle.

6. A cantaliver spring construction for vehicles, comprising a leaf spring connected at its middle and at its rear end to the vehicle frame, the forward end of said spring being near the axle, a link interconnecting the forward end of said spring and said axle, and a connection from said axle to a point on the vehicle frame in advance of the axle.

7. A cantaliver spring construction for vehicles, comprising a leaf spring connected at its middle and at its rear end to the vehicle frame, the forward end of said spring being near the axle, a link interconnecting the forward end of said spring and said axle, and a connection from said axle to a point on the vehicle frame in advance of the axle, said connection being pivoted to the frame at a point which is higher than the axis of the wheel mounted on said axle, said connection being formed by a second leaf spring.

8. A cantaliver spring construction for vehicles, comprising a leaf spring connected at its middle and at its rear end to the vehicle frame, the forward end of said spring being near the axle, a link interconnecting the forward end of said spring and said axle, and a connection from said axle to a point on the vehicle frame in advance of the axle, said connection being formed by a second leaf spring.

9. A cantaliver spring construction for vehicles, comprising a leaf spring connected at its middle and at one end to the vehicle frame, the other end of said spring being near the axle, a link interconnecting the latter end of said spring and said axle, and a connection from said axle to a point on the vehicle frame on the other side of said axle from said spring, said spring comprising a plurality of leaves of which an intermediate one is longer than the others and furnishes at its ends the means for connecting the ends of the spring to the vehicle frame and the link respectively.

10. A cantaliver spring construction for vehicles, comprising a leaf spring connected at its middle and at its rear end to the vehicle frame, the forward end of said spring being near the axle, a link interconnecting the forward end of said spring and said axle, and a connection from said axle to a point on the vehicle frame in advance of the axle, said spring comprising a plurality of leaves of which an intermediate one is longer than the others and furnishes at its ends the means for connecting the ends of the spring to the vehicle frame and the link respectively.

11. A cantaliver spring construction for vehicles, comprising a leaf spring pivotally connected at its middle to and hung at one end by a link from the vehicle frame, the other end of said spring being near the axle, a link interconnecting the latter end of said spring and said axle, and a connection from said axle to a point on the vehicle frame on the other side of said axle from said spring.

12. A cantaliver spring construction for vehicles, comprising a leaf spring pivotally connected at its middle to and hung at its rear end by a link from the vehicle frame, the forward end of said spring being near the axle, a link interconnecting the forward end of said spring and said axle, and a connection from said axle to a point on the vehicle frame in advance of the axle.

13. A cantaliver spring construction for vehicles, comprising a leaf spring connected at its middle and at its rear end to the vehicle frame, the forward end of said spring being near the axle, a link interconnecting the forward end of said spring and said axle, and a connection from said axle to a point on the vehicle frame in advance of and higher than the axle.

14. A cantaliver spring construction for vehicles, comprising a leaf spring pivotally connected at its middle to and hung at its rear end by a link from the vehicle frame, the forward end of said spring being near the axle, a link interconnecting the forward end of said spring and said axle, and a connection from said axle to a point on the vehicle frame in advance of and higher than the axle.

15. A cantaliver spring construction for vehicles, comprising a leaf spring connected at its middle and at its rear end to the vehicle frame, the forward end of said spring being near the axle, a link interconnecting the forward end of said spring and said axle, and a resilient member connecting said axle to a point on the vehicle frame in advance of the axle.

16. A cantaliver spring construction for vehicles, comprising a leaf spring pivotally connected at its middle to and hung at its rear end by a link from the vehicle frame, the forward end of said spring being near the axle, a link interconnecting the forward end of said spring and said axle, and a resilient member connecting said axle to a point on the vehicle frame in advance of the axle.

In witness whereof I have hereunto set my hand at Connersville, Indiana, this 24th day of March, A. D. one thousand nine hundred and sixteen.

JOHN C. MOORE.

Witnesses:
  C. A. LAWSON,
  E. R. BURKART.